United States Patent [19]

Braid

[11] Patent Number: 5,112,497
[45] Date of Patent: May 12, 1992

[54] APPARATUS FOR SALVAGING AND REMOVING MARINE OIL SPILLS

[76] Inventor: Thomas C. Braid, 3146 Marion Way, Nanaimo, British Columbia, Canada, V9T 1J1

[21] Appl. No.: 662,631

[22] Filed: Feb. 28, 1991

Related U.S. Application Data

[62] Division of Ser. No. 522,988, May 14, 1990.

[30] Foreign Application Priority Data

Jun. 27, 1989 [CA] Canada ................................ 603973

[51] Int. Cl.$^5$ .................................................. C02F 1/40
[52] U.S. Cl. ...................................... 210/708; 210/790; 210/801; 210/923; 210/519
[58] Field of Search .............. 210/708, 242.3, 923, 210/776, 790, 801, 519, 540

[56] References Cited

U.S. PATENT DOCUMENTS

| | | | |
|---|---|---|---|
| 1,493,861 | 5/1924 | Kusch | 210/519 |
| 1,908,102 | 5/1933 | Arledter | 210/801 |
| 3,142,281 | 7/1964 | Muller | 210/242.3 |
| 3,223,243 | 12/1965 | Muller | 210/519 |
| 3,527,348 | 9/1970 | Lalonde et al. | 210/540 |
| 3,651,943 | 3/1972 | Di Perna | 200/242.3 |
| 3,730,346 | 5/1973 | Prewitt | 210/242.3 |
| 3,922,225 | 11/1975 | Strain | 210/242.3 |
| 4,025,424 | 5/1977 | Reichardt et al. | 210/790 |
| 4,394,265 | 7/1983 | Van Drimmelen et al. | 210/242.3 |
| 4,425,240 | 1/1984 | Johnson | 210/242.3 |
| 4,818,399 | 4/1989 | Midkiff | 210/242.3 |

FOREIGN PATENT DOCUMENTS 52-5179  1/1977  Japan .

Primary Examiner—Stanley S. Silverman
Assistant Examiner—Christopher Upton
Attorney, Agent, or Firm—Kelly Bauersfeld & Lowry

[57] ABSTRACT

This invention relates to a novel apparatus for cleaning and salvaging oil spills in marine environments. The invention is directed to a dual purpose vessel adapted for use in sand dredging and oil spill clean-up comprising: (a) a hull; (b) at least two pump suction tubes mounted to the exterior of the hull, the suction tube inlets being located below the water line of the hull, and being rotatably connected to the hull; (c) a draghead which is adapted to ride in part above the water level attached at the end of each suction tube opposite the suction tube inlet connection; (d) a buoyancy compensator cooperating with the draghead to ensure that at least part of the draghead rides above the water level at all times.

6 Claims, 4 Drawing Sheets

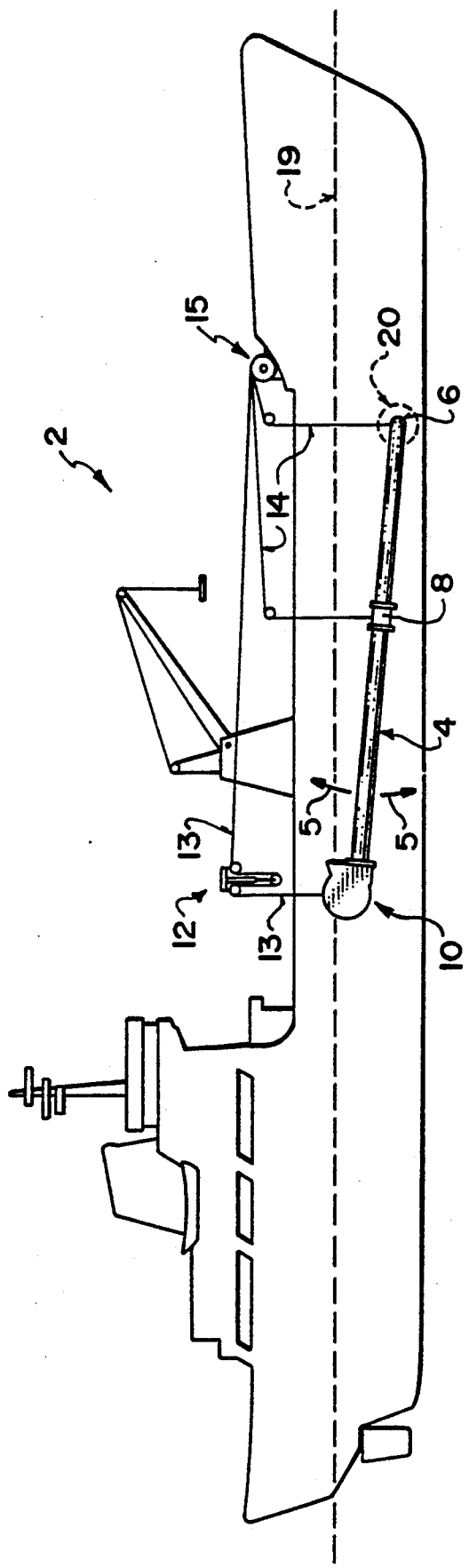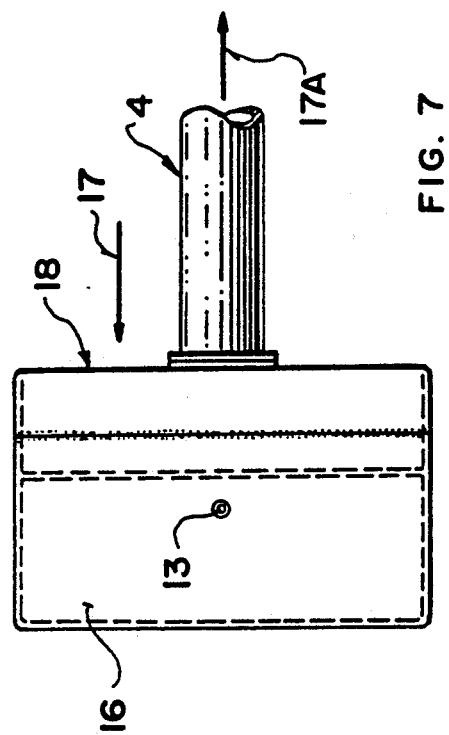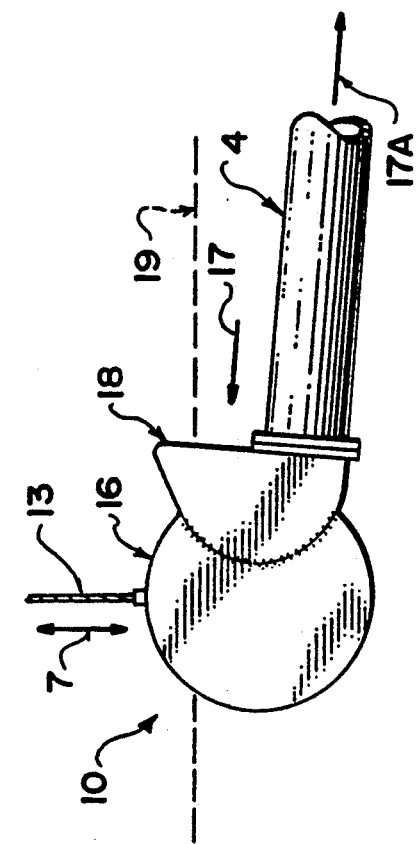

APPARATUS FOR SALVAGING AND REMOVING MARINE OIL SPILLS

This is a divisional of copending application Ser. No. 07/522,988 filed on May 14, 1990.

FIELD OF THE INVENTION

This invention relates to a novel apparatus for cleaning and salvaging oil spills in marine environments.

BACKGROUND OF THE INVENTION

Oil spills from petroleum transporting marine vessels cause tremendous environmental damage. The Andrea Dorea oil spill in the English Channel in the 1970's killed wildlife in the hundreds of thousands, created tremendous hardship for fishermen in the damaged area and fouled the beaches of France and England for at least ten years.

Recently, the Exxon Valdez, an oil tanker owned by Exxon Corporation, ran aground on a reef in the Gulf of Alaska and spilled tens of millions of gallons of crude oil into the ocean with staggering loss of wildlife and marine life such as sea birds, sea otters, seals, salmon and shellfish. It is estimated that it will take years before the damage is rectified. Efforts by Exxon to contain the spill and clean up the oil were pitiful. After much effort, only about 10,000 barrels of crude were recovered.

U.S. Pat. No. 4,394,265, granted Jul. 19, 1983, discloses a suction dredger that is provided with sweeping arms at the side of the vessel. The arms can be placed at an angle with respect to the body of the vessel and are provided with suction apparatus to suck away the upper layer of the water collected in front of the sweeping arms. The water is pumped into the hold of the vessel so that the hold optionally can be used for storing dredging material or oil respectively. Apparatus connects the sweeping arms to the vessel and moves the arms from an inward storage position into an outboard operative position and vice versa. The sweeping arms are in a tilted position when inboard and if necessary displaceable in the longitudinal direction of the vessel along its deck so that in the case of a suction dredger the normal dredging apparatus performs its function without being hampered by the sweeping arms. The apparatus is constructed so that the sweeping arms can be applied to any type of vessel.

SUMMARY OF THE INVENTION

The invention is directed to a dual purpose vessel adapted for use in sand dredging and oil spill clean-up comprising: (a) a hull; (b) at least two pump suction tubes mounted to the exterior of the hull, the suction inlets being located below the water line of the hull, and each being pivotally associated with the hull; (c) at least two dragheads which are adapted to ride in part above the water level and are attached at the respective ends of the suction tubes opposite the suction-hull inlet; and (d) at least two buoyancy floats secured to the respective dragheads to ensure that at least part of each draghead rides above the water level.

A vessel as described wherein the draghead and float are connected to a hull connected swell compensator which assists in maintaining a part of the draghead above water surface level. A vessel as described wherein the suction tube is raised and lowered by means of a hull mounted winch and cable system which is connected to the suction tube.

A vessel as described wherein a suction pump is positioned in the interior of the hull, and is connected to the suction inlet of the suction tube, the discharge of the suction pump being connected to a discharge tube which discharges material pumped by the suction pump to the interior of the vessel.

In the vessel as described, the hull may have in the interior thereof at least one hopper into which material pumped by the suction pump is discharged, the hopper having the capacity to discharge at least some of the discharged material through the bottom of the hull. In the vessel, a plurality of hoppers can be disposed in the hull and material pumped into the main hopper can overflow into adjacent hoppers in the vessel, the main discharge hopper being isolated from the adjacent hoppers.

A vessel as described wherein a suction tube is mounted on each side of the hull, each suction tube being connected to a respective pump, and each pump having a separate discharge tube, both discharge tubes discharging material into the main hopper. In the vessel, the discharge from the two discharge tubes can be directed at one another to assist in separating oil from the water in the discharge material.

A vessel as described wherein the hull can be fitted with baffles which assist in directing material pumped from the pair of discharge tubes into the main material hopper. In the vessel, the draghead swell compensator can be hydraulically operated.

DRAWINGS

In drawings which depict specific embodiments of the invention but which should not be construed as limiting or restricting the scope of the invention in any way:

FIG. 1 illustrates a side view of a vessel fitted with an oil slick draghead;

FIG. 2 illustrates a detail side view of a draghead with buoyancy;

FIG. 7, which appears on the same sheet as FIGS. 1 and 2, illustrates a top view of the floatation suction draghead.

DETAILED DESCRIPTION OF SPECIFIC EMBODIMENTS OF THE INVENTION

Figure 3:
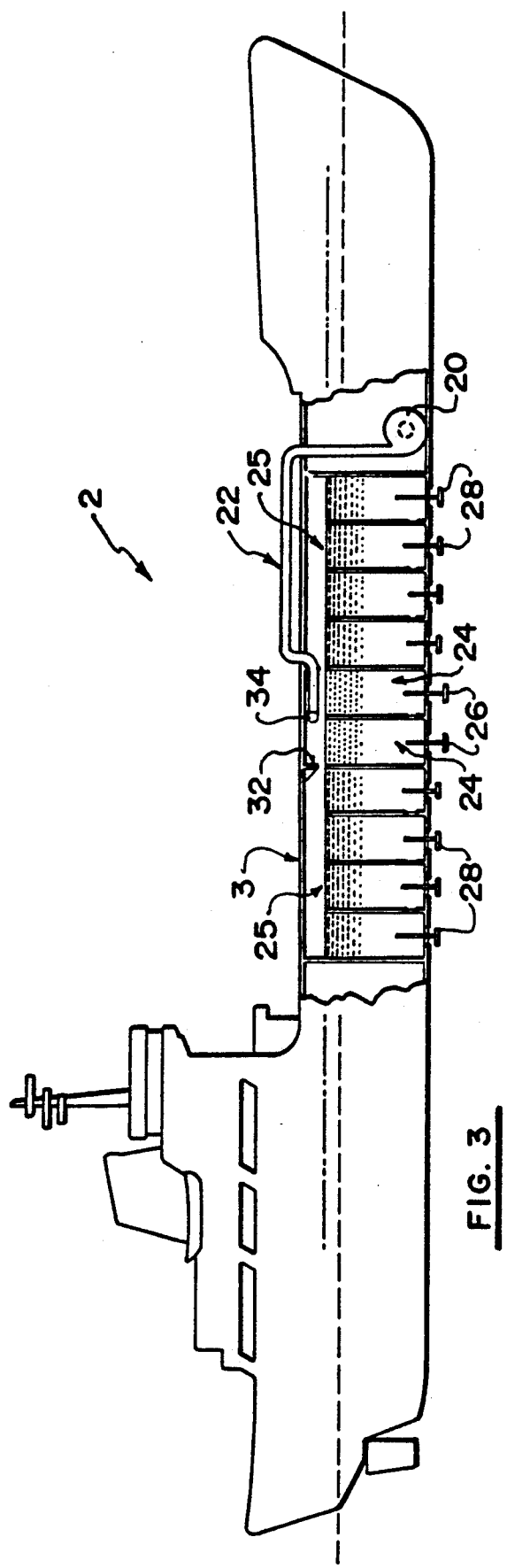
FIG. 3 illustrates a side cut-away view of a vessel exposing the oil/water hold tanks.

A specific embodiment of the invention is disclosed in FIGS. 1 to 7. Referring to FIG. 1, which illustrates a side view of a vessel fitted with an oil slick suction flotation draghead, it can be seen that the vessel 2 has disposed along the side thereof an elongated two part suction tube 4. The two part suction tube 4 is connected at one end to the hull of the vessel 2 below the water line by a water-tight sand pump suction inlet 6. The aft section of the suction tube 4 is universally pivotally connected by means of a universal coupling 8 to the foresection of the tube 4. The pivot direction is indicated by arrows 5-5. The universal coupling 8 and the inlet 6 are suspended by winch cables 14. The aft section end of the suction tube 4 opposite sand pump suction inlet 6 has attached thereto a floatation draghead 10.

The draghead 10 is suspended in place by a cable 13 from a swell compensator 12. The suction tube 4 can be disconnected from inlet 6 when not in use, raised by the winch cables 14 and cable 13, driven by winch 15, and stored on the deck of the vessel.

While not visible in FIG. 1, the vessel 2 has a similar suction tube 4, inlet 6, coupling 8, draghead 10, compensator 12 and winches 15 mounted on the opposite side of the vessel.

Referring to FIG. 2, which illustrates a detail side view of the floatation draghead 10 with buoyancy, it can be seen that the suction tube 4 is connected to a laterally extending horizontal semi-cylindrical draghead 18, the upper end of which extends above the water level 19. The draghead 18 is hollow and the lower portion is connected to the hollow suction tube 4. The draghead 18 is partially held in position relative to the water line by buoyancy float 16, which typically assumes about onethird third of the suction tube 4 and draghead 18 weight at this point. The float 16 in turn is suspended in position by cable 13 from swell compensator 12 which is connected to the deck of the vessel. The buoyancy float 16 assists in maintaining the draghead 18 at water level 19. However, the main responsibility for maintaining the draghead 18 in position relative to the water line 19, as seen in FIG. 2, rests with the swell compensator 12 and cable 13. The swell compensator 12 is typically a hydraulic cylinder and carries about two-thirds of the weight of the draghead 18. When the water level rises, the compensator 12 takes up slack; when the water level falls, the compensator 12 lowers the draghead proportionally. The direction of rise and fall of the draghead 10 is indicated by double headed arrow 7. Water/oil intake is indicated by arrow 17 while water-/oil travel in the tube 4 is idicated by arrow 17A.

FIG. 3 illustrates a side view of the vessel 2 with the mid-hold section cut away to reveal the hold (hopper) construction in the interior of the vessel. Ten hoppers are depicted, namely, aft hopper tanks Nos. 1' to 4', which are identified with reference number 25, two mid-hopper tanks Nos. 5' and 6', which are identified with reference number 24, and four forward hopper tanks Nos. 7' to 10', which are identified with reference number 25. A corresponding number of matching hoppers are constructed on the opposite side of the vessel. A sand pump 20, which is positioned in the interior of the hull of the vessel 2, and is connected to sand pump suction inlet 6, as shown in FIG. 1, is connected to sand pump discharge tube 22. The sand pump 20 via suction tube 4, and draghead 18 (not shown in FIG. 3), sucks in a mixture of sea water and oil from the oil spill, and discharges it through sand pump discharge tube 22. In a lowered position, when not engaged in oil spill clean-up, the flotation draghead would be replaced with a standard dredge draghead which would rest on the sea floor and the pump would suck in sand and solid material acting as a dredge.

The end of the discharge tube 22 opposite sand pump 20 discharges the pumped contents through a right angle elbow 34 directly above hopper tanks Nos. 5' and 6', as identified with reference No. 24. A corresponding tube 22B (see FIG. 4) and pump 20B discharges pumped contents into the corresponding hopper tanks on the opposite side of the vessel. A pair of bottom doors 26 are located respectively at the base of hopper tanks Nos. 5' and 6' (reference No. 24). Typically, discharge tubes 22 and pumps 20 move about a ton of water/oil per second. Thus a considerable volume of water/oil is moved through tanks Nos. 5' and 6'. Hopper tanks Nos. 5' and 6' are sealed from the fore and aft tanks by having the conventional limber holes 30 (see FIG. 5), which normally exist between adjacent hoppers, sealed. A baffle 32 prevents excessive spill-over from the discharge tube 20, via elbow 34, into the fore and aft hold tanks 25. The fore and aft hold hopper tanks 25 also have bottom doors 28, which are closed or only partially open.

Figure 4:
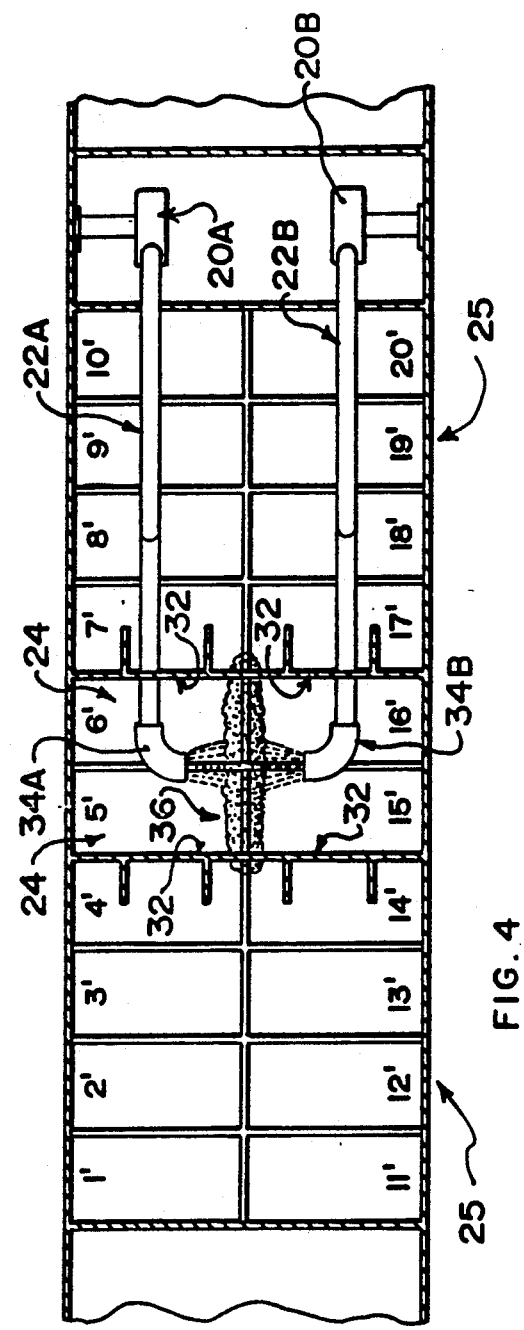
FIG. 4 illustrates a top view of the oil/water hold tanks of the vessel.

FIG. 4, which illustrates a top cut-away view of the oil/water hold hopper tanks 24 and 25 (seen as tanks 5' and 6', 15' and 16' in FIG. 4) of the vessel 2, depicts a pair of sand pumps 20, that is, port sand pump 20A and starboard sand pump 20B, connected respectively to port and starboard suction tubes 22A and 22B, and port and starboard right angle elbows 34A and 34B. As can be seen in FIG. 4, the material discharge from elbows 34A and 34B are aimed directly at one another. This impacting action is very important to the operation of the oil-water separation process because when the opposite discharges impact with one another, the relative velocity drops immediately to zero, the oil and water are subjected to a dispersing and separation action and a waterfall action 36 is created. This waterfall action permits the oil to separate from the water and instantly float at the top of the water. The majority of the discharge with the oil floating on the top as a froth or foam falls directly into the No. 5', 6', 15' and 16' hopper tanks 24. FIG. 4 also illustrates the pair of baffles 32 which assist in retaining the waterfall action 36 in the No. 5', 6', 15' and 16' hopper tanks.

Figure 5:
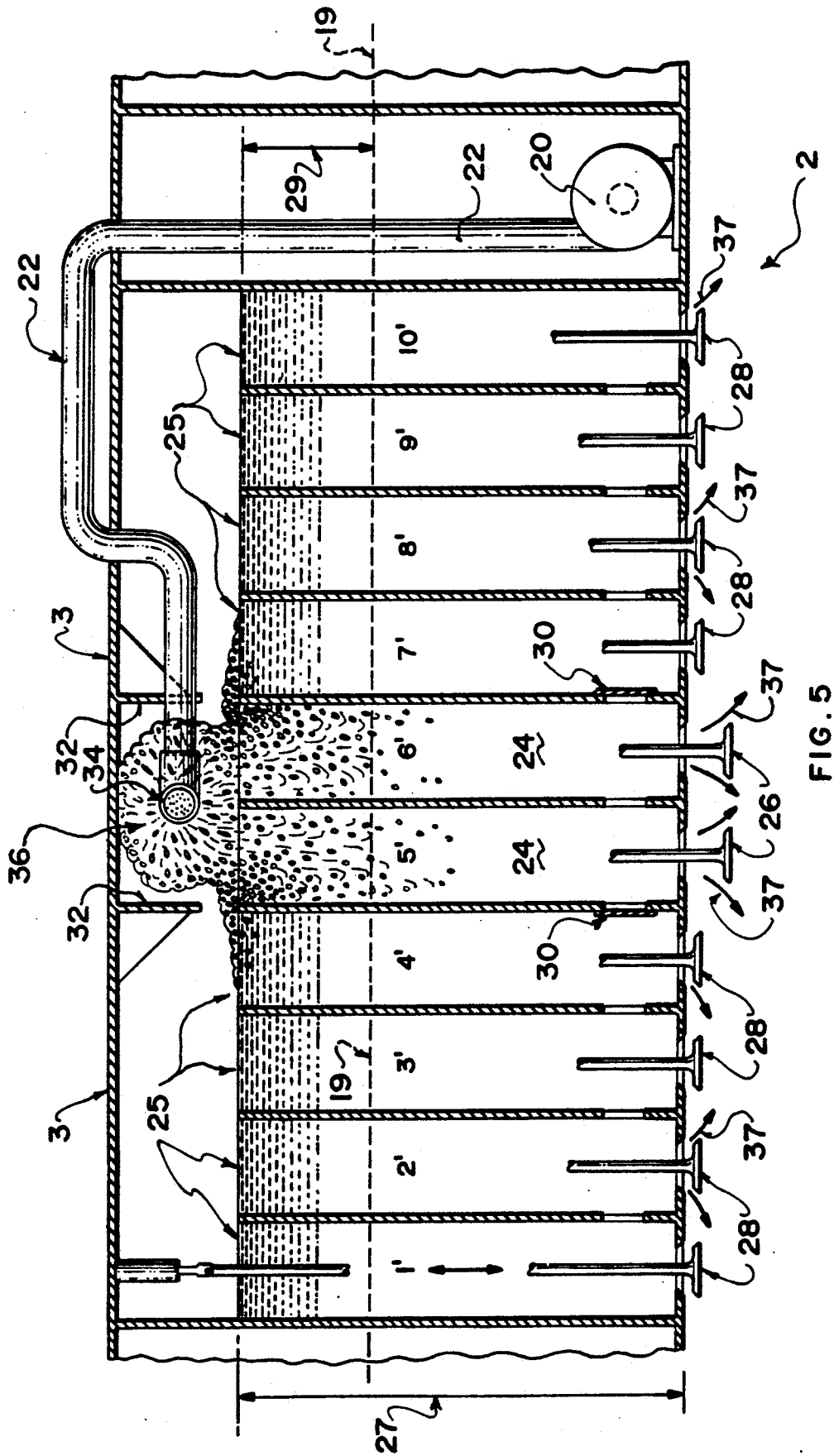
FIG. 5 illustrates an enlarged cut-away side view of the oil/water hold tanks.

FIG. 5 illustrates in detailed side elevation cutaway view the specific construction of the fore and aft hold tanks Nos. 1' to 4' and Nos. 7' to 10', and the mid No. 5' and 6' hopper tanks 24. The bottom doors 26 are shown fully open at the base of the No. 5' and 6' hopper tanks 24. This is required to permit the pumped ton of water per second to pass through the tanks Nos. 5' and 6'. The same is true of the opposite tanks Nos. 15' and 16'. The limber holes 30 are sealed in order to separate the No. 5' and 6' hopper tanks 24 from the adjacent hold tanks 25. Bottom doors 28, which are partially open, are located respectively at the base of each of the fore and aft hold tanks 25. The sand pump 20 pumps the ton per second oil/seawater mixture through sand pump discharge 22 and subsequently through right angle elbow 34 to create the oil dispersing waterfall effect. The discharge is depicted with reference numeral 36. As can be seen, since the waterfall action 36 virtually separates the oil from the water immediately, the oil floats on the top of the water and passes into adjacent tanks 1' to 4', 7' to 10', and on the opposite side tanks 11' to 14' and 17' to 20'. FIG. 5 illustrates also how the pair of baffles 32 located under the deck 3 prevent the bulk of the discharge 36 from dispensing into the fore and aft hold tanks 25. The bulk of the discharge 36 is directed by baffles 32 to drop directly into the Nos. 5', 6', 15' and 16' hopper tanks 24. The effect is that the bulk of the water passes downwardly through Nos. 5', 6', 15' and 16' hopper tanks 24, and the separated oil spillover from those tanks (primarily a highly concentrated mixture of oil relative to the water) flows into the fore and aft hold tanks 25. The oil collects at the top of the fore and aft hold tanks 25 and oil can be collected in these tanks until the tanks 25 are full. The bottom doors 26 permit the bulk of the pumped water (a ton of water per second) to exit the bottom of the vessel 2. This is indicated with directional arrows 37. The floating oil which spills over into fore and aft tanks 25 is retained and surplus water is passed out through bottom doors 28. It should be noted that the liquid level remains even in fore and aft hold tanks 25 because those tanks are connected by common limber holes, which are not sealed as is the case with the limber holes 30 separating the Nos. 5', 6', 15' and 16' hopper tanks 24 from the fore and aft hold tanks 25. Sea water level outside the vessel is indicated by line 19. The oil/water mixture pumped into the vessel has a positive head indicated by line 29.

Figure 6:
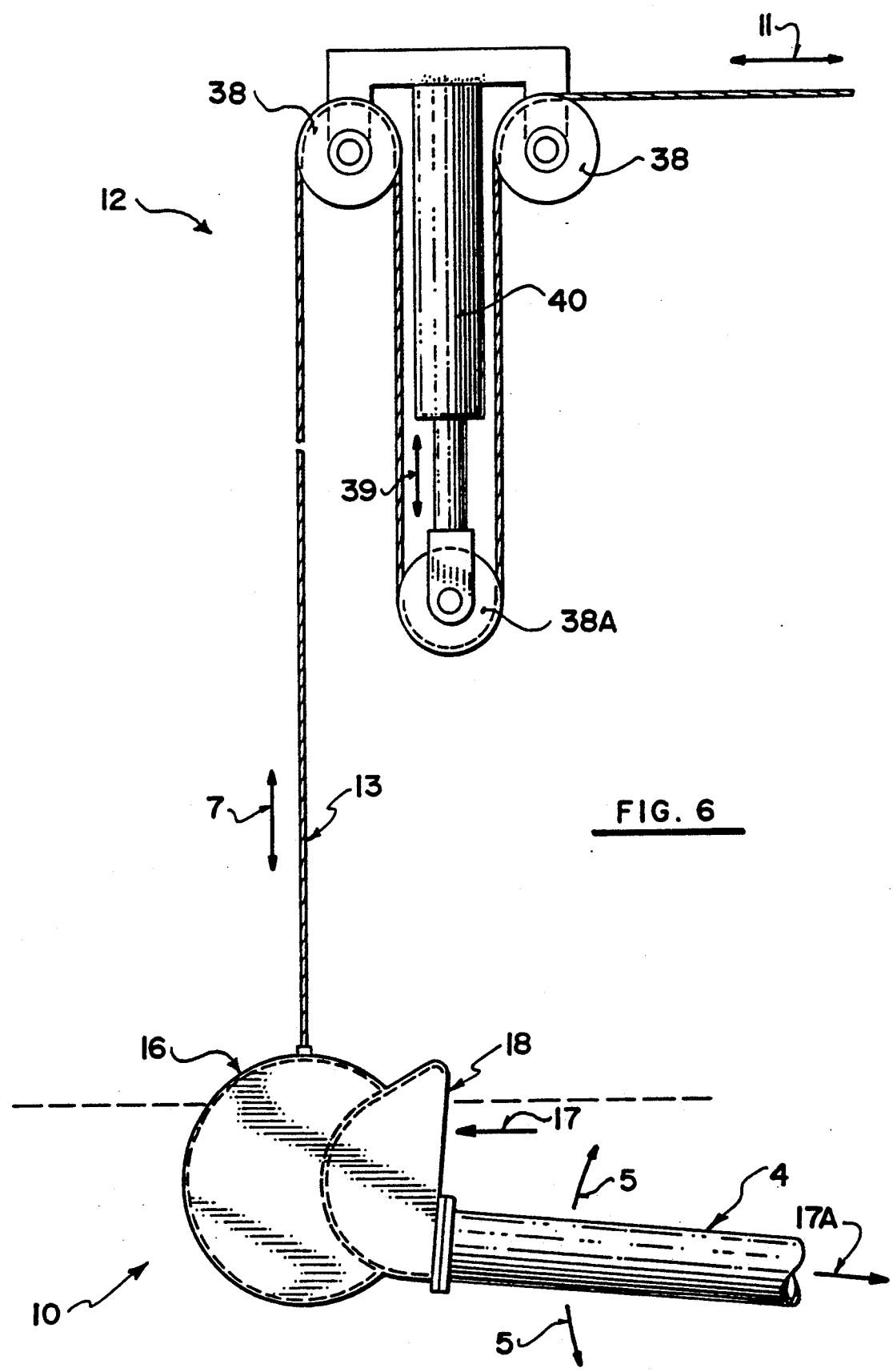
FIG. 6 illustrates a side view of a swell compensator for the floatation suction draghead with buoyancy.

FIG. 6 illustrates in detailed side view the construction of the swell compensator 12, buoyancy float 16 system. The cable 12 passes through a pair of pulleys 38. A swell compensator mechanism 40, such as a hydraulic cylinder in which the oil pressure can be adjusted to provide the proper buoyancy compensating factor, is positioned between the respective pulleys 38 and 38A. Direction of movement of the cylinder 40 is indicated by arrow 39. Independently, without the compensator 12, the flotation draghead 10 would be three times the size of that shown in the drawings. The combination of the float 16 and the compensator 12 enables the size of the draghead 18 to be reduced by two thirds. This buoyancy compensator system provides a substantial amount of flexibility and enables the draghead 18 to deal with rapid changes in water level 19, thereby ensuring that the float 16 and draghead 18 remain in proper relative orientation to the level of the water 19, even in rough waters. The swell compensator 40 is normally controlled to carry about 20 tons of the draghead 18 weight which is typically about 30 tons. The buoyancy float 16 carries about 10 tons of the draghead weight. The swell compensator 12 is designed to absorb fluctuations in draghead weight due to changes in water level and permits smooth movement of the draghead 18 to compensate for roll of the vessel 2 and variable sea conditions. With proper compensator adjustment, maximum oil slick contaminant pick-up is provided by the draghead 18, and air locks and wave carryover are minimized. As can be recognized, if the draghead 18, particularly in rough seas, spends most of its time riding either above the water surface or below the water surface, then either mainly air or mainly sea water is sucked in through suction tube 4, which is inefficient. The objective is to ensure that the draghead 18 remains at water surface level as much as possible so that a mixture of oil and water from the oil slick is efficiently sucked into suction tube 4. Trim changes to adjust compensator 12 action are performed by winches 15 tightening or loosening cable 11.

The buoyancy compensator 12 is designed to absorb and quickly adjust for fluctuations in buoyancy load caused by water conditions. For example, when the water level rises due to wave action, the draghead 18 would tend through inertia to remain stationary unless the buoyancy weight is momentarily lightened. This is done by the hydraulic compensator 40. Thus, the draghead 18 then moves upward momentarily to thereby remain at water level. Likewise, if the water level drops, the compensator 40 makes a rapid adjustment and lets the draghead 18 drop so it follows the dropping water level. In this way, the draghead follows the rising and dropping water level caused by wave action or swells.

FIG. 7 illustrates a top view of the draghead 18 and buoyancy tank 16. The compensator cable 13 is connected to the cylindrical buoyancy tank. The draghead is in the form of a semi-cylinder with its front end open much like the intake of a vacuum cleaner wand, to receive the oil-water mixture, which is then sucked into tube 4.

It is very evident that the scale of equipment necessary to clean up catastrophic oil spills of millions of liters of petroleum must be equal to the degree of the spill. The equipment must be capable of handling tons of water per second in order to clean up the spill as rapidly as possible and thereby minimize environmental damage. It is also very evident that the equipment presently available world-wide has limited clean-up and salvage capabilities with moderate spills and no success whatsoever with major spills.

Specifications for equipment required to successfully clean up oil spills are as follows:

1. A floatation draghead pick-up capability within a boomed area and direct transfer to a large storage tanker;
2. A floatation draghead pick-up swath path clean-up of at least 33 meters;
3. A minimum continuous 6 knot operational capability, in order to achieve an actual area clean-up of 400,000 $m^2$/hour, or 1 sq. mile/10 hours;
4. A pumping capacity of at least 4,000 $m^3$/hour;
5. A continuous 4,000 $m^3$/hour contaminant separation system;
6. A minimum salvage operation capability in worst weather conditions of 10 ft. wave action;
7. A number of salvage oil holding tanks of 2,000 $m^3$ capacity;
8. A vessel capable of working dangerous navigational waters and confined wreck areas, including an experienced crew and modern dredge vessel equipment; and
9. A dual role dredge/oil slick salvage vessel.

A successful oil spill clean-up operation network should include stationing vessels in all sensitive areas and having the capability to deliver equipment on accident site within twenty-four hours, and a mandatory back-up vessel available within a further twenty-four hours to cover both major spill containment and oil slick clean-up.

The swath path clean-up is governed by the vessel's beam plus the extension of port and starboard floatation draghead width. It should be noted that a vessel with a 33 meter swath path and speed of operation, namely, a minimum 6 knot clean-up, is capable of dealing with virtually all supertanker oil spills, major or minor.

When a vessel of 5,000 tons moves through the water at 6 knots, the 5,000 ton water displacement aft has the effect of pulling surface water to the vessel's hull thus increasing the actual swath path contaminant by perhaps 50 percent.

The massive pumping capacity of the sand pumps of the vessel makes it possible through the two suction floatation dragheads 18 to cope easily with a typical 95 percent water, 5 percent oil slick pick-up analysis in order to minimize environmental damage. Speed is of the essence. It is not possible to have a swath path of 400,000 sq. m./hr. (1 to 2 tons of water containment per second) clean-up ability achieved by changing the oil/water percentages significantly. This fact makes the oil/water separation process most significant in the solution to the clean-up and salvage of all large marine oil release accidents.

A hopper tank capacity of at least 2,000 $m^3$ for salvage oil storage allows a normal clean-up of oil slick areas of approximately 2 sq. miles in about a time of twenty hours before a transfer of salvaged oil to a storage tanker is required. It should be noted that for initial oil slick containment where a boomed damage control accident has occurred and oil slick depth is excessive, pick-up by the floatation draghead of the invention within such a boomed area and direct transfer to a large storage tanker is desirable, possible, and effective with the invention that is disclosed herein.

To effectively ensure against oil spill disasters, it should be a requirement that all vessels carry sufficient boom length on board to encircle the vessel one and a half times so as to contain any oil leakage to a depth of one foot. This system can be put in place quickly to initially contain the spill until oil slick salvage vessels can arrive.

The invention pertains to a system and equipment for enabling a trailer suction dredge vessel to act as an oil slick salvage vessel, when required. The vessel thus has a dual role and can be operated effectively as a dredge in order to meet costs of operation while having the capacity to function as an oil spill clean-up vessel when the occasion demands.

The port and starboard sand pump discharges 22A and 22B are adjusted to perhaps 50 percent capacity and are directed to the midship hopper 24 discharge station. 90° elbow fittings 34A and 34B are attached to both discharge outlets so that the discharge flow is diverted thwartships and into direct opposing contact thereby causing two effects. The solid sand pump discharge flow pressure of 2 bar, capacity 50 m$^3$/min. (a ton of water per second), provides an atomising action which breaks up (separates) the oil slick contaminant elements. The second effect is that the discharge flow velocities of the two pumps 20A and 20B by impacting one another directly reduce the relative discharge velocity to zero. This converts the flow discharge action to a deluge or waterfall action. The oil-water separation is accomplished by the deluge or waterfall action which, because of the high discharge velocity from each discharge elbow impacting each other and reducing the net velocity to zero, causes the oil to disperse into tiny droplets. These oil droplets, because of the lighter specific gravity and coalescing action, do not penetrate appreciably into the water surface. The falling water, on the other hand, because of heavier specific gravity and lower coalescing action, penetrates well below the surface level. Thus a natural oil-water separation action is set up by the waterfall.

The reduction to effective net zero velocity also has the benefit that tremendous currents which would otherwise occur in the hoppers are effectively nullified, thereby enhancing the oil-water separation action. The effect of this is that the oil is dispersed into tiny droplets which immediately separate from the water and float as a foam or froth as the discharge falls to the top surface of the water in the hoppers.

The volume discharge through the bottom doors 26 of Hopper Nos. 5', 6', 15' and 16' should be about 0.45 meters ullage per minute to enable the water pumped into those hoppers to pass from the holds and maintain proper oil froth-water level in those hoppers. This slow rate of tank discharge through bottom doors 26 where a tank sounding of 8.5 meters is maintained guarantees that all oil contaminant remains as a froth on the water surface and can be directed to the forward and aft tanks 25 by deluge and floating action and stored there. Tanks 25 typically would have a bleed discharge of about 5 percent pump volume through the bottom doors 28.

The discharge rate through bottom doors 28 can be increased or decreased if the oil/water interface of the oil slick calls for it. The oil collected in the forward and aft tanks 1' to 4', 7' to 10', 11' to 14' and 17' to 20' will increase with time as more oil-water is passed into those tanks. When the tanks are 90 percent full of oil, the tanks are unloaded into an awaiting tanker.

The swell compensator 12 is designed to maintain a predetermined constant controlled load of about 10 tons on the draghead when dredging on the sand or gravel pit floor (sea bottom). This represents approximately ⅓ of the total draghead 18 and suction tube 4 distributed weight. It is possible for the draghead 18 to maintain correct water surface position by designing a floatation draghead 16 and 18 so that the buoyancy carries this constant load with a margin of safety of, say, 20 percent. The swell compensator 12 then gives fast, smooth hunting control that is necessary for all ship movements and sea conditions. This allows maximum oil slick contaminant pick-up by the sand pump suction and eliminates air locks and wave carry over.

If apparatus according to the invention had been available with respect to the recent Valdez spill accident, the slick could have been contained in the initial stages. Salvage vessels according to the invention can be designed to have a potential containment equal to any boomed damage control area. However, it should be noted that great improvement in design must be made with booms so as to contain oil spills to a much larger depth and capacity. The potential clean-up capacity of the invention of one sq. mile/10 hours would be sufficient to cope with any moderate spill. It should be remembered that on exceptionally large (major) spills, containment control would be maintained until other salvage vessels of the same potential capacity arrive on site.

Previous thinking regarding capital costs involved to have fully manned salvage vessels of a size capable of dealing with major oil spills stationed at perhaps 500 mile coastal intervals throughout sensitive areas are generally seen as prohibitive. However, since the dual role trailer suction dredge oil slick clean-up vessels are fast 16 to 18 knot ships, they can be allowed to undertake dredge contracts in their allotted area. This would offset, if not cover, all operational expenses incurred. The conversion to oil slick/containment salvage can be completed easily in the twenty-four hours enroute to the accident site.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A method of separating oil from an oil-water mixture which comprises directing two flows of an oil-water mixture from substantially opposite directions against one another and at substantially equal velocity, without intervening baffles between the two flows and at a position above a container, the two flows being directed against each other at a velocity sufficient to disperse the oil into small particles and to reduce the net velocity of the opposed flows to substantially zero, whereby the oil and water of the two flows fall into the container with a substantial number of the oil particles floating on the surface of the water within the container.

2. The method according to claim 1 further including the step of discharging the water within the container from below the surface and conveying the small floating oil particles from the surface to an adjacent container.

3. A method according to claim 2 wherein the containers are located in a ship hull.

4. A method according to claim 2 wherein the oil and water of the two flows fall into a plurality of primary containers and the small floating oil particles and a portion of the water are conveyed to a plurality of secondary containers adjacent the primary containers.

5. A method according to claim 4 wherein separated water is discharged from the bottoms of the primary and secondary containers.

6. A method according to claim 5 wherein the primary and secondary containers are interconnected below the surface of the water.

* * * * *